(12) United States Patent
Begin et al.

(10) Patent No.: US 7,075,459 B1
(45) Date of Patent: Jul. 11, 2006

(54) VEHICLE SPEED SENSOR FOR NAVIGATION SYSTEM

(75) Inventors: John D. Begin, Sterling Hts., MI (US); Larry Spencer, Lake Orion, MI (US)

(73) Assignee: Magellan DIS, Inc., Rochester Hills, MI (US)

( * ) Notice: Subject to any disclaimer, the term of this patent is extended or adjusted under 35 U.S.C. 154(b) by 0 days.

(21) Appl. No.: 09/507,955

(22) Filed: Feb. 22, 2000

Related U.S. Application Data

(60) Provisional application No. 60/120,931, filed on Feb. 22, 1999.

(51) Int. Cl.
*G08G 1/123* (2006.01)

(52) U.S. Cl. ............... 340/988; 340/426.19; 340/992; 701/1

(58) Field of Classification Search ........... 340/988, 340/444, 447, 995, 467, 903, 992, 995.25, 340/426.19; 73/178, 1.37; 701/216, 217, 701/1, 213
See application file for complete search history.

(56) References Cited

U.S. PATENT DOCUMENTS

| | | | |
|---|---|---|---|
| 4,156,131 A | | 5/1979 | Haynes et al. ............. 235/95 |
| 4,319,220 A | * | 3/1982 | Pappas et al. ............. 340/58 |
| 4,563,574 A | | 1/1986 | Dreyer et al. ............. 235/95 |
| 4,694,295 A | * | 9/1987 | Miller et al. ............ 340/903 |
| 4,697,278 A | | 9/1987 | Fleischer ................. 377/24 |
| 4,833,281 A | * | 5/1989 | Maples ................. 200/61.45 |
| 4,950,914 A | * | 8/1990 | Kurihara et al. .......... 307/10.1 |
| 5,003,704 A | | 4/1991 | Schubert ................. 33/775 |
| 5,177,685 A | * | 1/1993 | Davis et al. ............. 364/443 |
| 5,263,770 A | | 11/1993 | Goudey ................. 301/37.37 |
| 5,505,080 A | * | 4/1996 | McGhee ................. 73/146.5 |
| 5,524,034 A | | 6/1996 | Srygley et al. ............ 377/15 |
| 5,661,651 A | * | 8/1997 | Geschke et al. ........... 701/88 |
| 5,673,018 A | | 9/1997 | Lowe et al. ............. 340/445 |
| 5,682,095 A | | 10/1997 | Mathes et al. ........... 324/174 |
| 5,731,702 A | | 3/1998 | Schroeder et al. ...... 324/207.21 |
| 5,734,159 A | | 3/1998 | Osajda ................. 250/231.13 |
| 5,736,852 A | | 4/1998 | Pattantyus .............. 324/166 |
| 5,783,992 A | * | 7/1998 | Eberwine et al. .......... 340/445 |
| 5,828,585 A | | 10/1998 | Welk et al. ............ 364/571.01 |
| 6,029,496 A | * | 2/2000 | Kreft .................... 73/1.37 |
| 6,175,302 B1 | * | 1/2001 | Huang ................. 340/442 |
| 6,243,007 B1 | * | 6/2001 | McLaughlin et al. ....... 340/447 |
| 6,249,246 B1 | * | 6/2001 | Bode et al. ........... 342/357.14 |
| 6,253,154 B1 | * | 6/2001 | Oshizawa et al. ......... 701/221 |

FOREIGN PATENT DOCUMENTS

GB 2242527 10/1991

* cited by examiner

*Primary Examiner*—Phung T. Nguyen
(74) *Attorney, Agent, or Firm*—Lowe Hauptman & Berner, LLP

(57) ABSTRACT

A vehicle navigation system includes a vehicle displacement sensor comprising a wireless transmitter generating a signal indicating rotational displacement of a vehicle component. A complementary wireless transmitter receives the signal from the transmitter. A computer calculates vehicle speed or displacement based upon the rotational speed or displacement of the vehicle component. In a preferred embodiment, the transmitter is secured to a wheel of the vehicle and generates an RF signal upon each revolution of the wheel.

33 Claims, 1 Drawing Sheet

VEHICLE SPEED SENSOR FOR NAVIGATION SYSTEM

This application claims priority to U.S. Provisional Application Ser. No. 60/120,931 that was filed on Feb. 22, 1999.

BACKGROUND OF THE INVENTION

The present invention relates generally to a vehicle speed sensor and more particularly to a vehicle speed sensor for use in a navigation or dead reckoning system.

Many vehicle navigation or route-guidance systems utilize "dead-reckoning" to propagate the position of the vehicle, usually in combination with other sensors and known techniques, such as a GPS receiver, map-matching, etc. For dead-reckoning, generally the displacement or speed of the vehicle is measured, as is the vehicle's heading. By determining the displacement of the vehicle in a determined heading, the position of the vehicle is propagated, typically relative to a database of roads.

The speed and/or displacement of the vehicle is currently obtained directly from the vehicle's electrical and control systems. Since vehicles' electrical control systems are not standardized, it is often costly or inconvenient to connect to these systems when installing a navigation system in the vehicle. Moreover, some manufacturers are eliminating the availability of speed information to "third party" electronic systems.

SUMMARY OF THE INVENTION

The present invention provides a vehicle speed sensing system which can be installed easily in any vehicle to provide displacement and speed information to the navigation system. The speed sensing system generally comprises a remote unit fixed on a part of the vehicle which rotates proportionately to displacement of the vehicle. A receiving unit is affixed to the vehicle and receives a signal from the remote unit indicative of the rotation of displacement of the rotating vehicle part. The displacement of the vehicle is proportional to the rotational displacement of the vehicle part.

Preferably, the remote unit counts the rotations of the vehicle part. In one embodiment, a transmitter in the remote unit sends a "beacon" signal upon each one or one-half rotations of the vehicle part. The relationship of rotation of the vehicle part to vehicle displacement is determined by comparing rotations of the vehicle part with other measured or computed displacements of the vehicle, as determined from the other sensors and/or comparison to a map database.

In one embodiment, the remote unit is secured to the air pressure valve stem of the vehicle wheel. The remote unit includes its own power source which generates power from the rotational energy.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE PREFERRED EMBODIMENT

Figure 1:
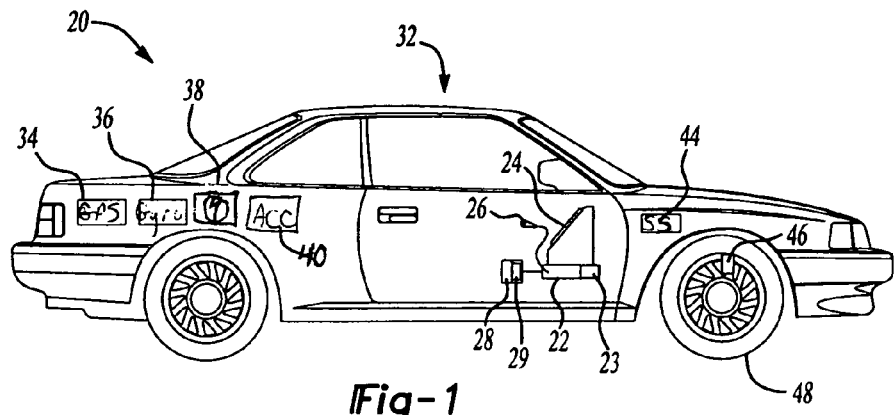
FIG. 1 is a schematic of the navigation system for the present invention.

The navigation system 20 of the present invention is shown schematically in FIG. 1. The navigation system 20 includes a CPU 22 having RAM 23 and connected to a display 24, such as a high resolution LCD or flat panel display. The CPU 22 is also connected to an input device 26 such as a mouse, keyboard, key pad, remote device or microphone. Alternatively, the display 24 can be a touch screen display. The navigation system 20 further includes a storage device 28, such as a hard drive 28 or CD ROM, connected to the CPU 22. The storage device 28 contains a database 29 including a map of all the roads in the area to be traveled by the vehicle 32 as well as the locations of potential destinations, such as addresses, hotels, restaurants, and may contain the software for the CPU 22, including the graphical user interface, route guidance, operating system, position-determining software, etc.

The navigation system 20 preferably includes position and motion determining devices, such as a GPS receiver 34, a gyroscope 36, a compass 38, and a multi-axis accelerometer 40, all connected to the CPU 22 (connections not shown for simplicity). Such position and motion determining devices are well known and are commercially available. The navigation system 20 further includes a speed sensor 44, 46, which will be explained in more detail with reference to the other figures.

As is well known, the position and motion determining devices determine the position of the vehicle 32 relative to the database of roads. Further, as is known in navigation systems, the user can select a destination relative to the database of roads utilizing the input device 26 and the display 24. The navigation system 20 then calculates and displays a recommended route directing the driver of the vehicle 32 to the desired destination. Preferably, the navigation system 20 displays turn-by-turn instructions on display 24, guiding the driver to the desired destination.

The vehicle speed sensor 44, 46 comprises a receiving unit 44 and a remote unit 46. The remote unit 46 is secured to a wheel 48 of the vehicle 32. Generally, the remote unit 46 generates a signal indicative of the rotational displacement of the wheel 48. The receiving unit 44 receives the signal from the remote unit 46 and relays the signal to the CPU 22. Preferably, the remote unit 46 generates a "beacon" signal one time for every revolution of the wheel 48. In another embodiment, the remote unit 46 counts revolutions of the wheel 48 and periodically sends an intelligent signal indicating the number of revolutions. The number of revolutions of the wheel 48 will be proportional to the displacement of the vehicle 32.

Speed of the vehicle 32 is derived from the displacement over a given time period. The CPU 22 (with the necessary software) calibrates the vehicle speed sensor 44, 46 automatically. Preferably, the CPU 22 determines the mathematical relationship between revolutions by wheel 48 (or beacon signals from remote unit 46) and vehicle displacement. The CPU 22 determines this relationship by comparing the number of revolutions of wheel 48 (or beacon signals) with distances as determined by any or a combination of other sensors or techniques, such as the GPS receiver 34, the accelerometer 42 and map-matching with database 29.

Once the relationship of signals from remote unit 46 and vehicle speed is determined, vehicle speed from the vehicle speed sensor 44, 46 is utilized by the CPU 22 in propagating position of the vehicle 32 by dead-reckoning, utilizing known techniques. Since the vehicle speed sensor 44, 46 is calibrated after installation onto the vehicle 32, there is no need to provide any information to the CPU 22 regarding the type of vehicle 32 onto which the vehicle speed sensor 44, 46 is installed.

Figure 2:
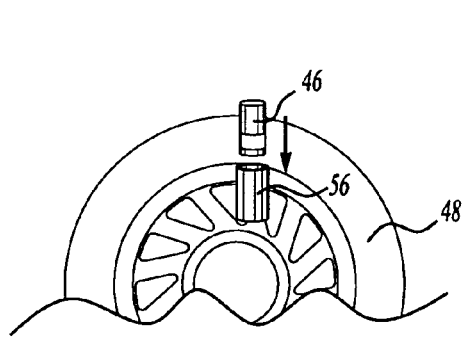
FIG. 2 is an enlarged, partially exploded view of the remote unit of the vehicle speed sensor of FIG. 1.

The remote unit 46 may be secured to the vehicle wheel 48 as shown in FIG. 2. The remote unit 46 is secured to the valve stem 50 of the wheel 48. The remote unit 46 includes an internally threaded inner end which is threaded onto the externally threaded outer end of valve stem 50, replacing the typical valve stem cap.

Figure 3:
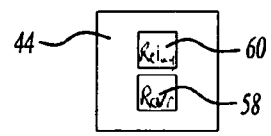
FIG. 3 is a more detailed schematic of the remote unit and receiving unit of the vehicle speed sensor of FIG. 1.
Figure 3:
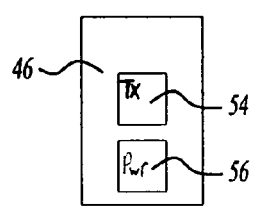

FIG. 3 is a high-level schematic of the receiving unit 44 and remote unit 46. Generally, the remote unit 46 includes a transmitter 54 and a power source 56. The receiving unit 44 includes a receiver 58, complementary to the transmitter 54. The receiving unit 54 further includes circuitry 60 for relaying the information from the receiver 58 to the CPU 22 (FIG. 1).

Figure 4:
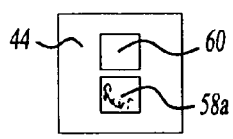
FIG. 4 illustrates one embodiment of the vehicle speed sensor of FIG. 3.
Figure 4:
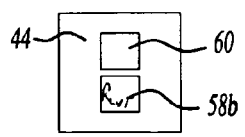
Figure 4:
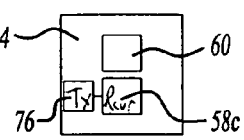
Figure 4:
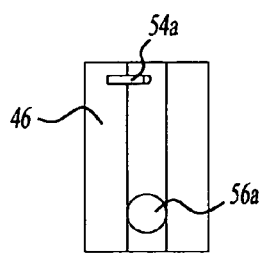

FIG. 4 illustrates one embodiment implementing the schematic of FIG. 3. In FIG. 4, the remote unit 46 includes a power source 56 which is simply a mass 56*a* moveable within a housing of remote unit 46. The transmitter 54 of remote unit 46 is a tuning fork 54*a*. The receiving unit 44 includes a receiver 58*a* which is generally a microphone and high-Q tuned receiver, tuned to receive the frequency of tuning fork 54*a*. In this embodiment, the remote unit 46 must be mounted near the center of the rotating wheel 48. The mass 56*a*, preferably a steel ball, falls towards the center of the earth and strikes the tuning fork 54*a* once per revolution of wheel 48. The frequency emitted from tuning fork 54*a* is detected by the receiver 58*a* and the circuitry 60 indicates to the CPU 22 (FIG. 1) that one revolution of wheel 48 has occurred.

Figure 5:
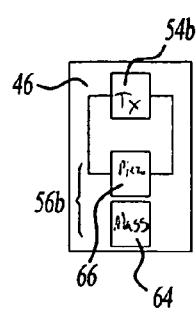
FIG. 5 is a schematic of a second embodiment of the vehicle speed sensor of FIG. 3.

FIG. 5 illustrates a second embodiment wherein the power source 56*b* comprises a mass 64 secured to a piezo generator 66. The piezo generator 66 is connected to a resonant LC tank circuit 54*b*. During each revolution, the mass 64 moves a distance with force and generates electrical charge to cause the resonant LC tank circuit 54*b* to generate a short RF burst. The receiver 58*b* is tuned to the frequency of the resonant LC tank circuit 54*b*. The circuitry 60 sends a signal to the CPU 22 (FIG. 1) each time the RF burst is received from the remote unit 46, indicating one revolution of the wheel 48.

Figure 6:
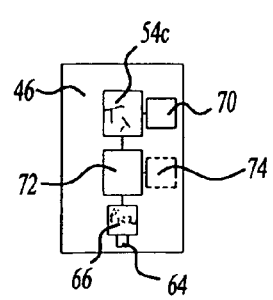
FIG. 6 is a schematic of a third embodiment of the vehicle speed sensor of FIG. 3.

FIG. 6 illustrates a third embodiment of the wheel speed sensor of FIG. 3. The remote unit 46 again includes the piezo generator 66 and mass 64 which senses the revolutions of the wheel 48. The piezo generator 66 is connected to circuitry 72 which detects the change in force that the mass 64 exerts on the piezo generator 66 during revolution from positive 1G to negative 1G. The transmitter 54C is preferably an RF transmitter powered by a battery 70. The transmitter 54C may send an RF burst or "beacon" signal once or twice per revolution of the wheel 48.

More preferably, the circuitry 72 accumulates a plurality of revolutions, preferably between 10 to 50, and generates a modulated signal which is sent by the RF transmitter 54C. The complementary RF receiver 58C receives the modulated signal indicating a number of revolutions and a circuitry 60 indicates this number to the CPU 22.

The remote unit 46 optionally includes a receiver 74 which receives an interrogation signal from a transmitter 76 in the receiving unit 44. In this case, the circuitry 72 would accumulate the number of revolutions sensed by the piezo generator 66 until the receiving unit 44 transmits an interrogation signal from transmitter 76 which is received by receiver 74 on the remote unit 46. Upon receiving the interrogation signal, the circuitry 72 modulates the number of revolutions, which is sent via transmitter 54C to the receiver 54C. The remote unit 46 may include a "sleep mode" during which power is conserved, but revolutions are counted. Upon receiving the interrogation signal, the remote unit "wakes up" and transmits the number of revolutions.

Alternatively, transmitter 54C may use modulated backscatter to communicate a modulated signal, such as number of revolutions, to receiving unit 44. Modulated backscatter is generally known to those skilled in the art. Generally, the transmitter 54C includes an antenna that can be resonant or non-resonant at the frequency beam employed. Resonance is switched on and off by a transistor connected across the antenna. Changes in the impedance of the antenna are reflected back to the receiver/transmitter 58C, 76. If modulated backscatter is used, the transmitter 54C may be powered by the battery 70 or may be powered by the signal received from the transmitter 76.

The vehicle speed sensor 44, 46 of the present invention is easy to install into any vehicle 32. Since, the vehicle speed sensor 44, 46 is automatically calibrated by the navigation system 20, there is no need for information regarding the vehicle 32 onto which the vehicle speed sensor 44, 46 is installed.

It should be recognized that a separate microprocessor or other hardware or circuitry could also be used to calibrate the signal from the vehicle speed sensor 44, 46 and/or covert the signal to vehicle speed or displacement information.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A vehicle navigation system, comprising:
   a wireless transmitter including a power source generating a wireless signal indicative of a vehicle displacement that periodically transmits said signal;
   a wireless receiver receiving said wireless signal from said transmitter; and
   a processor associated with said receiver for calculating the vehicle position based upon signals from a position determining device and said wireless signals indicative of said vehicle displacement.

2. The vehicle navigation system of claim 1 wherein said transmitter is mounted on a rotating component of a vehicle.

3. The vehicle navigation system of claim 2 wherein said transmitter is mounted on a wheel.

4. The vehicle navigation system of claim 2 wherein said transmitter generates an acoustic signal.

5. The vehicle navigation system of claim 2 wherein said transmitter generates an RF signal.

6. The vehicle navigation system of claim 2 wherein said transmitter generates a fixed number of beacon signals upon each revolution of the vehicle part.

7. The vehicle navigation system of claim 6 wherein said fixed number is one.

8. The vehicle navigation system of claim 1 wherein said power source generates power based upon motion.

9. The vehicle navigation system of claim 1 wherein said transmitter generates modulated RF signal indicative of vehicle displacement.

10. The vehicle navigation system of claim 1, wherein said position determining device is a GPS.

11. The vehicle navigation system of claim 1, wherein said position determining device is a dead reckoning device.

12. A vehicle navigation system, comprising:
means for generating a wireless signal indicative of rotational displacement of a vehicle part which periodically transmits said wireless signal;
a wireless receiver receiving said wireless signal;
means for determining displacement of a vehicle based upon said wireless signal; and
means for calculating the vehicle position based upon signals from a position determining device and said wireless signals indicative of said vehicle displacement.

13. The vehicle navigation system of claim 12 wherein said means for generating is mounted on a wheel.

14. The vehicle navigation system of claim 13 wherein said means for generating includes a power source generating power based upon rotation.

15. The vehicle navigation system of claim 12 wherein said wireless signal is an acoustic signal.

16. The vehicle navigation system of claim 12 wherein said wireless signal is an RF signal.

17. The vehicle navigation system of claim 12 wherein said means for generating generates a fixed number of beacon signals upon each revolution of the vehicle part.

18. The vehicle navigation system of claim 12 wherein said fixed number is one.

19. The vehicle navigation system of claim 12 wherein said means for generating generates a modulated RF signal indicative of vehicle displacement.

20. The vehicle navigation system of claim 12 further including a mass movable relative to said vehicle part based upon motion, said wireless signal generated based upon motion of said mass.

21. The vehicle navigation system of claim 20 wherein said mass is mounted to a piezo-electric device.

22. The vehicle navigation system of claim 12 further including means for calibrating said wireless signal to vehicle displacement while the vehicle is moving.

23. The vehicle navigation system of claim 12 further including means for dead-reckoning a position of a vehicle based upon said wireless signal.

24. A vehicle navigation system comprising:
means for generating a wireless signal including a power source indicative of rotational displacement of a vehicle part which periodically transmits said wireless signal;
a receiver receiving said wireless signal; and
means for calculating the vehicle position based upon signals from a position determining device and said wireless signals indicative of said vehicle displacement.

25. The vehicle navigation system of claim 24 further including means for calibrating said wireless signal to vehicle displacement while the vehicle is moving.

26. The vehicle navigation system of claim 24 further including a database of roads, said position of said vehicle propagated relative to said database of roads.

27. The vehicle navigation system of claim 24 further including means for dead-reckoning a position of a vehicle based upon said wireless signal.

28. The vehicle navigation system displacement sensor of claim 24 wherein said means for generating a wireless signal counts rotations of a vehicle wheel.

29. The vehicle navigation system of claim 28 further including means for calibrating rotations of said vehicle wheel to displacement of the vehicle.

30. A method for determining vehicle displacement including the steps of:
generating a wireless signal indicative of rotational displacement of a vehicle part which periodically transmits said wireless signal;
receiving said wireless signal;
determining displacement of a vehicle based upon said wireless signal; and
means for calculating the vehicle position based upon signals from a position determining device and said wireless signals indicative of said vehicle displacement.

31. The method of determining vehicle displacement of claim 30 further including the step of calibrating the wireless signal to vehicle displacement.

32. The method of claim 31 further including the step of dead-reckoning a position of a vehicle based upon the wireless signal.

33. The method of claim 32 wherein the dead-reckoning the position of the vehicle is based upon the calibrated wireless signal.

* * * * *